(12) United States Patent
Elad et al.

(10) Patent No.: US 8,527,939 B2
(45) Date of Patent: Sep. 3, 2013

(54) GUI MODELING OF KNOWLEDGE BASE IN A MODELING ENVIRONMENT

(75) Inventors: Rafi Elad, Herzelia (IL); Ido Keren, Hod Hasharon (IL)

(73) Assignee: SAP AG, Walldorf (DE)

( * ) Notice: Subject to any disclaimer, the term of this patent is extended or adjusted under 35 U.S.C. 154(b) by 1896 days.

(21) Appl. No.: 11/520,959

(22) Filed: Sep. 14, 2006

(65) Prior Publication Data
US 2008/0126932 A1 May 29, 2008

(51) Int. Cl.
*G06F 9/44* (2006.01)
*G06F 3/00* (2006.01)

(52) U.S. Cl.
USPC ........... 717/105; 717/101; 717/104; 717/106; 715/705; 715/708

(58) Field of Classification Search
None
See application file for complete search history.

(56) References Cited

U.S. PATENT DOCUMENTS

| | | | |
|---|---|---|---|
| 5,850,548 A * | 12/1998 | Williams | 717/107 |
| 6,102,967 A * | 8/2000 | Feigner et al. | 717/113 |
| 6,199,195 B1 * | 3/2001 | Goodwin et al. | 717/104 |
| 6,233,537 B1 * | 5/2001 | Gryphon et al. | 703/1 |
| 6,636,250 B1 | 10/2003 | Gasser | |
| 6,678,668 B2 | 1/2004 | Fisher et al. | |
| 6,782,528 B1 | 8/2004 | Bennett et al. | |
| 6,789,252 B1 * | 9/2004 | Burke et al. | 717/100 |
| 6,850,548 B2 * | 2/2005 | Villareal et al. | 372/50.11 |
| 6,876,314 B1 * | 4/2005 | Lin | 341/50 |
| 6,901,595 B2 * | 5/2005 | Mukundan et al. | 719/316 |
| 6,965,855 B1 * | 11/2005 | Burbridge et al. | 703/22 |
| 6,968,535 B2 | 11/2005 | Stelting et al. | |
| 6,986,120 B2 * | 1/2006 | Reddy et al. | 717/104 |
| 7,024,658 B1 * | 4/2006 | Cohen et al. | 717/117 |
| 7,185,315 B2 * | 2/2007 | Sharp et al. | 717/109 |
| 7,191,404 B2 * | 3/2007 | Barker et al. | 715/760 |
| 7,272,819 B2 | 9/2007 | Seto et al. | |
| 7,503,032 B2 * | 3/2009 | Bhaskaran et al. | 717/104 |
| 7,519,739 B2 * | 4/2009 | Comeau et al. | 709/248 |
| 7,603,651 B2 * | 10/2009 | De Brabander | 717/105 |
| 7,716,278 B2 * | 5/2010 | Beringer et al. | 709/203 |
| 7,849,405 B1 * | 12/2010 | Coletta et al. | 715/708 |
| 7,849,440 B1 * | 12/2010 | Englehart | 717/106 |
| 7,865,829 B1 * | 1/2011 | Goldfield et al. | 715/708 |
| 7,966,562 B1 * | 6/2011 | Brewton et al. | 715/705 |

(Continued)

OTHER PUBLICATIONS

Stefano Ceri et al., "Conceptual modeling of data-intensive Web applications", [Online], IEEE, 2002, pp. 1-17, [Retrieved from Internet on Jun. 14, 2013], <http://citeseerx.ist.psu.edu/viewdoc/download?doi=10.1.1.109.4266&rep=rep1&type=pdf>.*

(Continued)

*Primary Examiner* — Thuy Dao
*Assistant Examiner* — Ziaul A Chowdhury
(74) *Attorney, Agent, or Firm* — Fish & Richardson P.C.

(57) ABSTRACT

This disclosure relates to methods, systems, and software for GUI modeling of at least one contextual help object, potentially representing a knowledgebase, in a modeling environment. For example, software for utilizing contextual help may be operable to identify a business object for an application and associate a contextual help object in a knowledgebase repository to the identified business object. The software may be further operable to automatically configure the front-end of the application using the modeling environment and based on the business object and the contextual help object and, upon activation of the business object, to display just-in-time help to a user of the application via the front-end.

16 Claims, 5 Drawing Sheets

(56) References Cited

U.S. PATENT DOCUMENTS

| | | | |
|---|---|---|---|
| 2002/0108101 A1* | 8/2002 | Charisius et al. | 717/105 |
| 2002/0194039 A1* | 12/2002 | Bhaskaran et al. | 705/7 |
| 2003/0132963 A1* | 7/2003 | Barker et al. | 345/762 |
| 2004/0017392 A1 | 1/2004 | Welch | |
| 2004/0031017 A1* | 2/2004 | Vaidyanathan et al. | 717/110 |
| 2004/0098732 A1 | 5/2004 | Clement et al. | |
| 2004/0148586 A1 | 7/2004 | Gilboa | |
| 2004/0168107 A1* | 8/2004 | Sharp et al. | 714/33 |
| 2004/0181596 A1 | 9/2004 | Sabiers et al. | |
| 2004/0187140 A1* | 9/2004 | Aigner et al. | 719/328 |
| 2004/0187141 A1* | 9/2004 | Tobin | 719/330 |
| 2004/0207659 A1 | 10/2004 | Goodman et al. | |
| 2004/0233237 A1* | 11/2004 | Randow | 345/763 |
| 2004/0243685 A1 | 12/2004 | Sabiers et al. | |
| 2004/0243944 A1 | 12/2004 | Sabiers et al. | |
| 2005/0021689 A1 | 1/2005 | Marvin et al. | |
| 2005/0028107 A1* | 2/2005 | Gomes et al. | 715/762 |
| 2005/0050229 A1* | 3/2005 | Comeau et al. | 709/248 |
| 2005/0066285 A1* | 3/2005 | Santori et al. | 715/763 |
| 2005/0066304 A1* | 3/2005 | Tattrie et al. | 717/101 |
| 2005/0138634 A1 | 6/2005 | Luty et al. | |
| 2005/0256882 A1 | 11/2005 | Able et al. | |
| 2006/0101445 A1 | 5/2006 | Carbajales et al. | |
| 2006/0150148 A1 | 7/2006 | Beckett et al. | |
| 2007/0079282 A1 | 4/2007 | Nachnani et al. | |
| 2007/0156868 A1 | 7/2007 | Keren et al. | |
| 2007/0157096 A1 | 7/2007 | Keren et al. | |
| 2007/0162456 A1* | 7/2007 | Agassi et al. | 707/10 |
| 2007/0179841 A1 | 8/2007 | Agassi et al. | |
| 2007/0240118 A1 | 10/2007 | Keren | |
| 2008/0109722 A1* | 5/2008 | Gengler et al. | 715/708 |
| 2008/0126932 A1 | 5/2008 | Elad et al. | |
| 2008/0127052 A1* | 5/2008 | Rostoker | 717/105 |
| 2008/0141237 A1 | 6/2008 | Elad et al. | |

OTHER PUBLICATIONS

Michael Rosemann et al., "Contextualization of Business Processes", [Online], 2008, pp. 1-17, [Retrieved from Internet on Jun. 14, 2013], <http://eprints.qut.edu.au/14016/1/14016.pdf>.*

Brian Berenbach, "The Evaluation of Large, Complex UML Analysis and Design Models", [Online], Software Engineering 2004, pp. 1-10, [Retrieved from Internet on Jun. 14, 2013], <http://citeseerx.ist.psu.edu/viewdoc/download?doi=10.1.1.83.9217&rep=rep1&type=pdf>.*

Marielba Zacarias et al., "Modeling Contexts for Business Process Oriented Knowledge Support",[0nline], 2005, pp. 1-8, [Retrieved from Internet on Jun. 14, 2013], <http://www.inesc-id.pt/pt/indicadores/Ficheiros/2429.pdf>.*

Office Action issued in U.S. Appl. No. 11/321,392 on Jan. 25, 2008; 14 pages.

Office Action issued in U.S. Appl. No. 11/321,392 on Jul. 18, 2008; 12 pages.

Office Action issued in U.S. Appl. No. 11/602,588 on Jun. 30, 2009; 10 pages.

Office Action issued in U.S. Appl. No. 11/602,588 on Nov. 30, 2009; 12 pages.

* cited by examiner

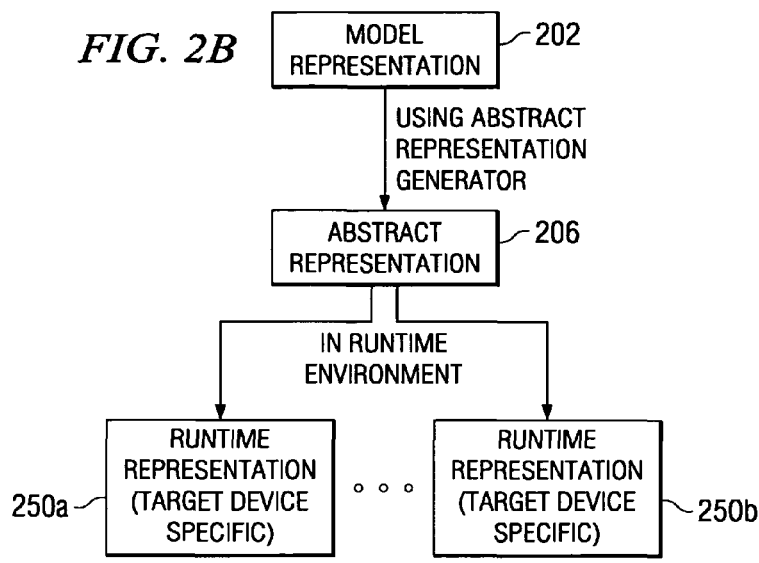
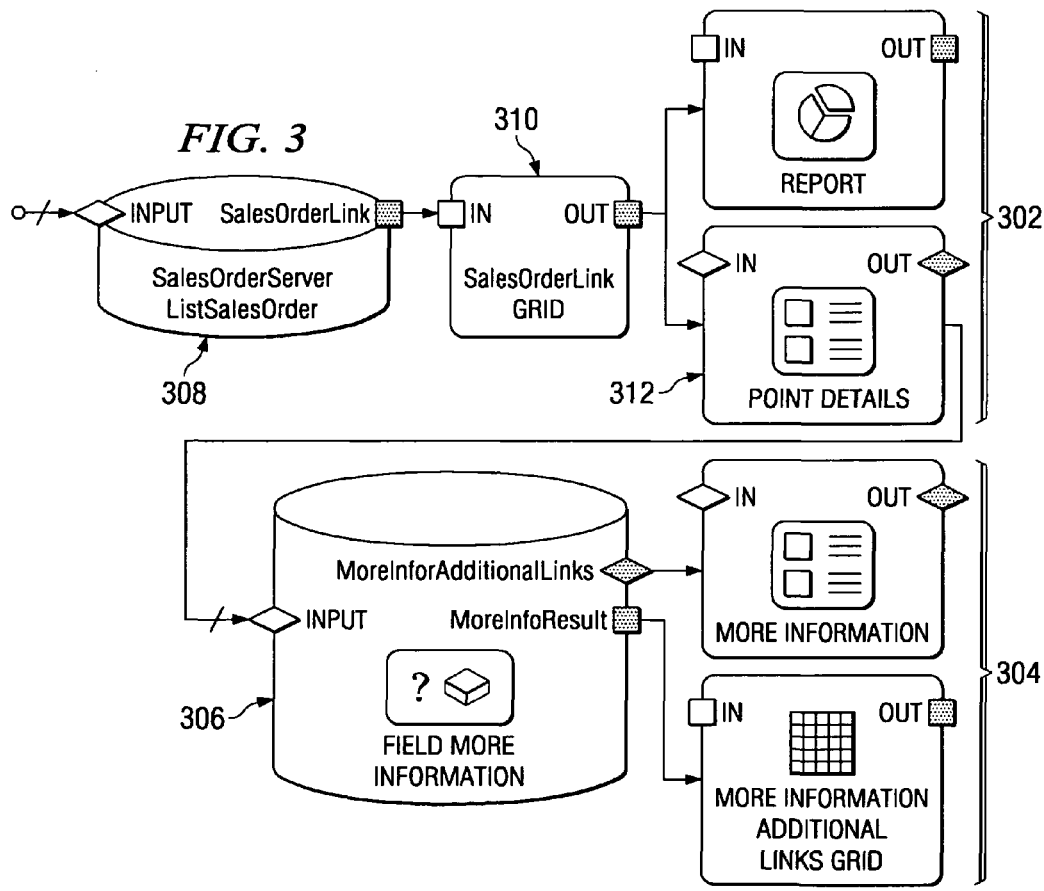

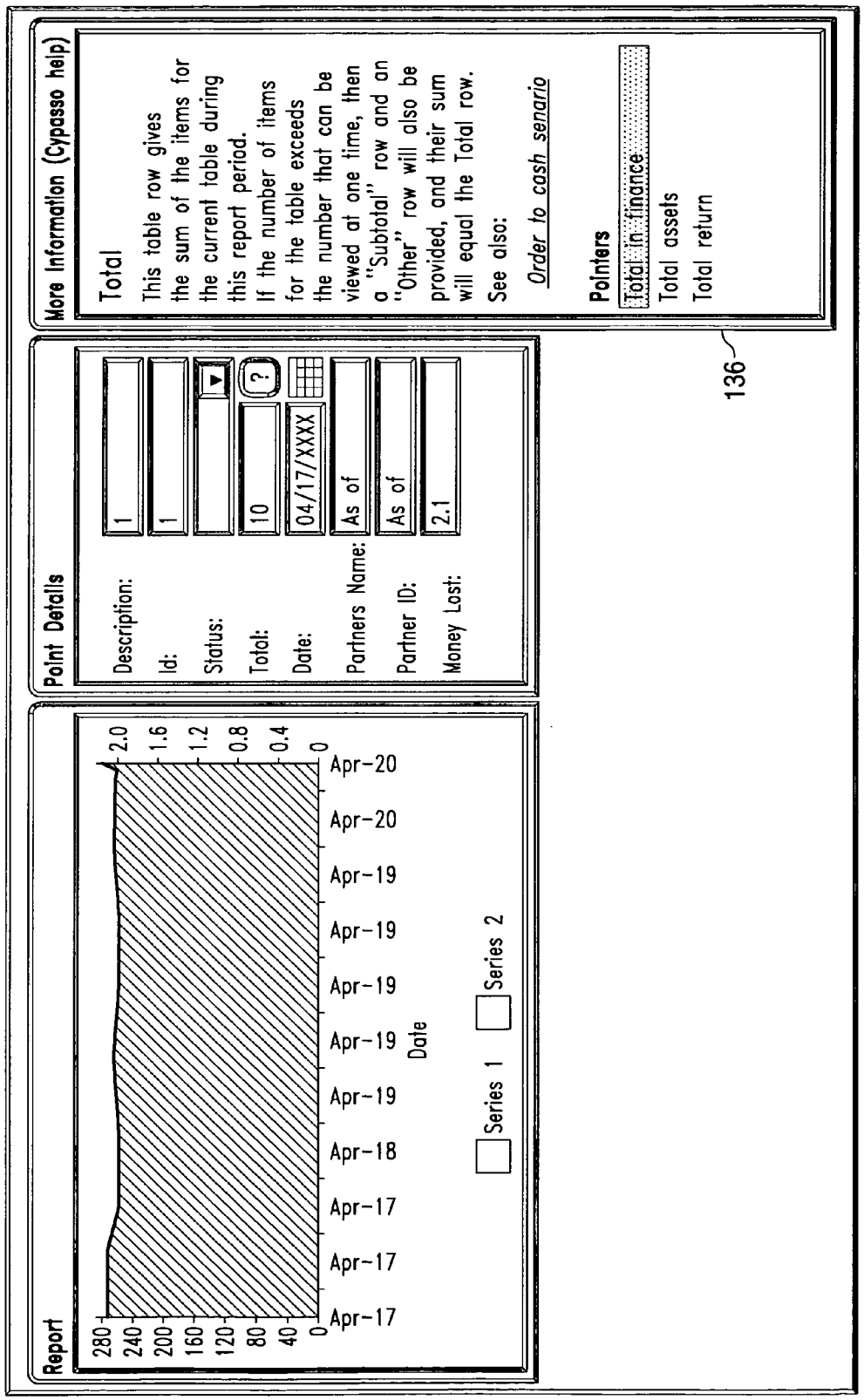

GUI MODELING OF KNOWLEDGE BASE IN A MODELING ENVIRONMENT

TECHNICAL FIELD

This disclosure relates to computer systems and methods and, more particularly, to methods, systems, and software for GUI modeling of at least one contextual help object, potentially representing a knowledgebase, in a modeling environment.

BACKGROUND

While using various software applications, users often require help and guidance to understand or better use various components or functionality of the particular application. For example, the user may be new to a particular business process. In another example, the business process may be modified to meet the business best practices and the user might be unfamiliar with or desire refreshing on the underlying best practice. To help deal with this, various applications provide an electronic book or a help index within the software. Other times, the developers may provide electronic or physical documentation separate from the particular application. Sometimes, the application may allow the user to request help text on a particular piece of the application, such as a button.

SUMMARY

This disclosure relates to methods, systems, and software for GUI modeling of at least one contextual help object, potentially representing a knowledgebase item, in a modeling environment. For example, software for utilizing contextual help may be operable to identify a business object for an application and associate a contextual help object in a knowledgebase repository to the identified business object. The software may be further operable to automatically configure the front-end of the application using the modeling environment and based on the business object and the contextual help object and, upon activation of the business object, to display just-in-time help to a user of the application via the front-end.

DESCRIPTION OF DRAWINGS

FIG. 2B depicts a simplified process for mapping a model representation to a runtime representation using the example modeling environment of FIG. 2A or some other modeling environment;

FIG. 3 illustrates an example help object embedded as part of a graphical user interface (GUI);

FIG. 4B illustrates an example web-based business process application that displays contextual help in a help area.

DETAILED DESCRIPTION

This disclosure generally describes an example system 100 for creating, managing, and implementing contextual help using a graphical user interface (GUI) modeling environment 116. This GUI modeling environment 116 may be any development tool, toolkit, application programming interface (API), application, or other framework that allows a developer to develop, configure, and utilize contextual help objects that are "encapsulated" during modeling (or during design time). For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

In certain situations, contextual help objects can more efficiently provide on-demand or task-sensitive help to users of one or more applications developed using business objects. Contextual help objects may be associated with a field, a screen, an error message, a business process, a best practices level, or any other business object. Often, this business object is a web service that might then be considered a user friendly web service. For example, the executed (or invoked) business object may be graphically linked within a development tool to one or more contextual help objects via metadata in the right time and place. In this fashion, multiple implementations or instances of the particular or similar business objects may reference or link to the help object. In another example, the help objects may be linked to a web service front-end based on events, behavior, situation at design time, and so forth. This may also allow system 100 to partially or fully decouple the work of the developer and an information developer. Such example aspects may provide a faster learning curve via problem-oriented learning, increase user satisfaction and adoption of such developed business objects by increasing usability, increasing user efficiency with guidance and help, as well as to potentially reduce errors. This may allow the example business owner or enterprise to more easily train the users in a highly targeted fashion. Moreover, graphically linking such contextual help to these business objects may help increase volume readiness for the particular developer, reseller, or host by reducing the need for support.

Figure 1A:
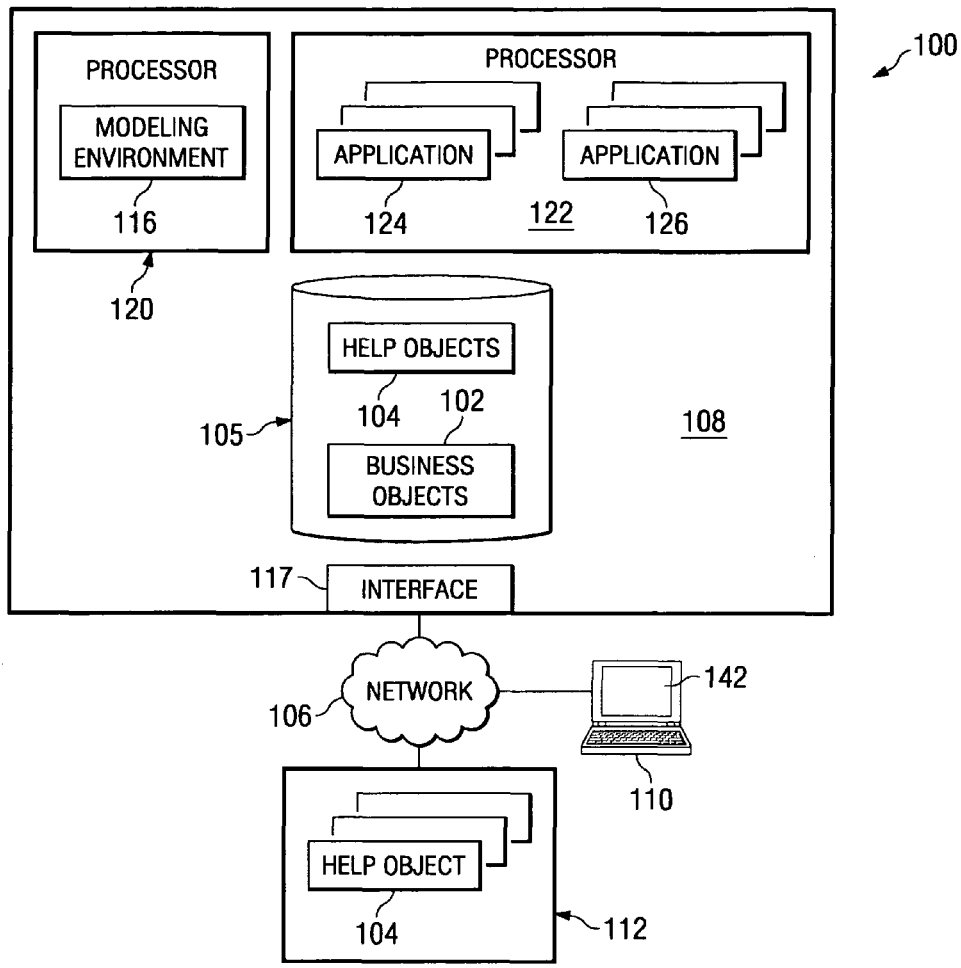
FIGS. 1A and 1B illustrate an example system for creating, managing, and implementing contextual help in accordance with one embodiment of the present disclosure.

With respect to example FIG. 1A, system 100 is typically a distributed client/server system that spans one or more networks such as 106. As described above, rather than being delivered as packaged software, portions of system 100 may represent a hosted solution, often for an enterprise or other small business, that may scale cost-effectively and help drive faster adoption. In this case, portions of the hosted solution may be developed by a first entity, while other components are developed by a second entity. Moreover, the processes or activities of the hosted solution may be distributed amongst these entities and their respective components. In some embodiments, system 100 may be in a dedicated enterprise environment—across a local area network or subnet—or any other suitable environment without departing from the scope of this disclosure.

Turning to the illustrated embodiment, system 100 includes or is communicably coupled with server 108, one or more clients 110, one or more help object providers 112, at least some of which communicate across network 106. Server 108 comprises an electronic computing device operable to receive, transmit, process and store data associated with system 100. For example, server 108 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1A provides merely one example of computers that may be used with the disclosure. Each computer is generally intended to encompass any suitable processing device. For example, although FIG. 1A illustrates one server 108 that may be used with the disclosure, system 100 can be implemented using computers other than servers, as well as a server pool. Indeed, server 108 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 108 may be adapted to execute any operating system including Linux, UNIX, Windows Server, or any other suitable operating system. According to one embodiment, server 108 may also include or be communicably coupled with a web server and/or a mail server.

Returning to server 108, it often includes local memory 105. Memory 105 may include any memory or database module and may take the form of volatile or non-volatile memory including, without limitation, magnetic media, optical media, random access memory (RAM), read-only memory (ROM), removable media, or any other suitable local or remote memory component. Illustrated memory 105 includes one or more business objects 102 and one or more help objects 104. But memory 105 may also include any other appropriate data such as HTML files or templates, data classes or object interfaces, unillustrated software applications or sub-systems, and others. Indeed, memory 105 may also be communicably coupled, directly or indirectly, with a plurality of help object providers 112. Help object providers 112 may be third party developers such as user groups, beta testers, business partners, and the like. Each of these providers 112 may be local or remote to server 108 so long as they develop, publish, or store one or more help objects 104. For example, memory 105 may include pointers or other references to a particular help object 104 that was published to a location remote from server 108. In this way, a local developer or non-technical business analyst may use a third party help object 104 to efficiently supplement the particular business object 102 he is modeling.

Figure 1B:
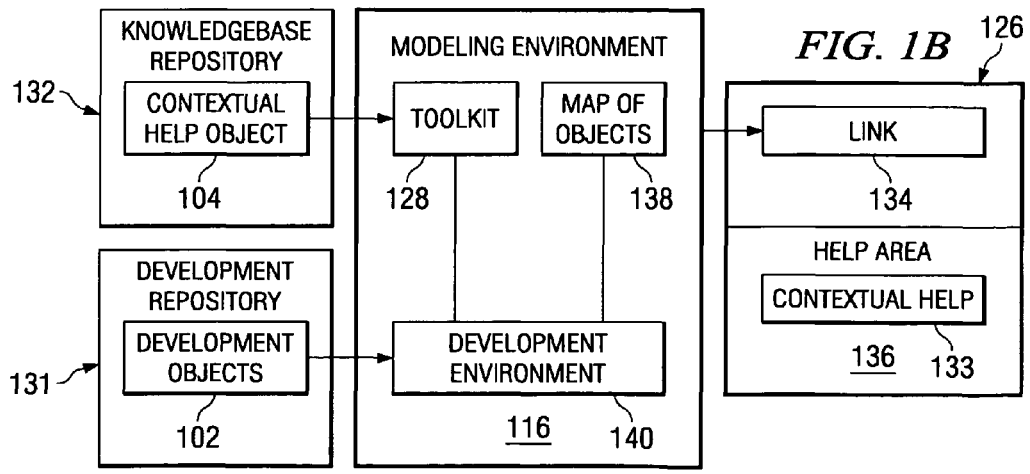

Business object 102 may be any business process, web service, applet, module, webpage, front-end element, development object or class, or any other software that a developer can utilize or reference in the front-end of any business or other modeled application and, when appropriate, enhance with help information. For example, a business object 102 may be provided to users as an invokable web service. System 100 may use these web services to offer a knowledgebase interface to users for receiving contextual help. In another example, a business object 102 may be an underlying business process that (directly or via some other component or object) receives input from the user via the front-end or provides output to the user via the front-end. Help objects 104 may be just-in-time help components or other software containing information about one or more business objects. For example, when the analyst inserts a dropdown box business object into an application, the help object 104 may be automatically or dynamically linked to the dropdown box business object to allow a user to access the help information during deployment. Regardless of the particular implementation, "software" may include software, firmware, wired or programmed hardware, or any combination thereof as appropriate. Indeed, each software component may be fully or partially written or described in any appropriate computer language including C, C++, Java, Visual Basic, assembler, Perl, any suitable version of 4GL, as well as others. It will be understood that while the software illustrated in FIGS. 1A-B are shown as single modules that implement the various features and functionality through various objects, methods, or other processes, each software component may instead include a number of sub-modules, third party services respectively, libraries, and such as appropriate. Conversely, the features and functionality of various components can be combined into single components as appropriate.

According to some embodiments, the developer (or other analyst) may use the model-driven development environment 116 to create pattern-based or freestyle user interfaces using simple drag-and-drop services on business objects 102 and then define the contextual help objects 104 that may be relevant to them. Because this development may be model-driven, the developer can typically compose an application using business objects 102 without having to write much, if any, code. In some cases, this example modeling environment may provide a personalized, secure interface that helps unify enterprise applications, information, and processes into a coherent, role-based portal experience. Further, the modeling environment may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment may provide a shared set of services for finding, organizing, and accessing unstructured content stored in third-party repositories and content management systems across various networks 106. Classification tools may automate the organization of information, while subject-matter experts and content managers can publish information to distinct user audiences. Regardless of the particular implementation or architecture, this modeling environment may allow the developer to easily develop help objects 104 or to add contextual help links to one or more applications or the component business objects 102 using this model-driven approach. Accordingly, this may emphasize features that provide users with a knowledgebase for a particular application. For example, contextual help links can be added to one or more online forms to provide instructions to a user about what information to provide in the form. As described in more example detail later, the model is deployed, system 100 may translate the model into the required code for at least one application or web service. This deployed model may then be modified or enhanced as appropriate using the modeling environment, which is typically executed on one or more processors.

For example, illustrated server 108 also includes processors 120 and 122. The processors 120 and 122 may each be a central processing unit (CPU), a blade, an application specific integrated circuit (ASIC), or a field-programmable gate array (FPGA). Both processor (120 and 122) may execute instructions and manipulate data to perform the operations of server 108. Although FIG. 1A illustrates two processors (120 and 122) in server 108, only one or more than two processors may be used according to particular needs or desires of system 100. In the illustrated embodiment, processor 120 executes model-driven development tool (or environment) 116 and processor 122 executes modeled application 124 and application 126. At a high level, the modeling environment 116 and applications 124, 126 are operable to receive and/or process requests from developers and/or users and present at least a subset of the results to the particular user via an interface. More specifically, each of applications 124 and 126 may represent any modeled software or other business functionality. For example, modeling environment 116 may be or include a developer studio tool or toolkit (as shown in example FIG. 2A) providing centralized administration of, development of, publishing of, and access to contextual help objects stored in the infrastructure. In another example, application 124 may represent a first application that is .NET-based, while application 126 may be a hosted web-based solution. In yet another example, each or both the applications 124 or 126 may be a modeled composite application with any number of portions that may be implemented as Enterprise Java Beans (EJBs) or the design-time components may have the ability to generate run-time embodiments into different platforms, such as J2EE, ABAP (Advanced Business Application Programming) objects, or Microsoft's .NET. In a further example, application 124 may merely be a modeled and published web service and application 126 may represent a slightly modified or second instance (say with different security permissions) of application 124. Further, while illustrated as internal to server 108, one or more processes associated with modeling environment 116, application 124, or application 126 may be stored, referenced, or executed remotely. For example, a portion of an application may be a web service that is remotely called, while another portion of the application may be an interface object bundled for processing at remote client 110. Moreover, modeling environment 116, application 124, or application 126 may each be a child or sub-module of other respective software modules or enterprise applications (not illustrated) without departing from the scope of this disclosure.

For example, FIG. 1B illustrates a more detailed implementation of such an environment for creating help links in an application. Of course, this implementation is merely one example and the various software, data and information, and interfaces may be employed in a different fashion, with other not illustrated components, or not employed at all. For example, illustrated modeling environment 116 includes a toolkit 128 and development environment 140. But modeling environment 116 may instead be standalone development application or a web-based solution distributed across a number of modules and computers. In another example, the knowledgebase repository 132 may be located on a remote system, while the modeling environment 116 can be located on a client system 110 and at least one of the implementing applications can reside on a hosted system.

Returning to the illustration, this example modeling environment 116 can create help links by automatically configuring the appropriate link within the tool. The modeling environment 116 may be used to minimize the effort required to create help components within applications and enable the reuse of existing help components for future applications. The modeling environment 116 may also enable just-in-time help in a user interface on demand, rather than creating code within the same application to display the help components in each application. For example, the modeling environment 116 may include a toolkit 128 for enabling information developers to display links to contextual help objects 130 in application 126. Generally, this toolkit may be an add-on, toolbox, library, sub-module, or other functionality that can easily link or facilitate the linking of contextual help objects 104 to models within development environment 140. In some embodiments, the help link can be created on-the-fly in the application 126 using the GUI modeling tool. In other embodiments, the modeling environment 116 may apply the deductive reasoning required to determine the location in the application to link contextual help objects. In other words, some or all of the business objects 102 and help objects 104 (whether actively or potentially linked to portions of the applications) may be stored or referenced in local or remote a development repository 131 and a knowledgebase repository 132, respectively. For example, these repositories may each include parameters, pointers, variables, algorithms, instructions, rules, files, links, or other data for easily providing information associated with or other logical structure of the particular object. More specifically, each repository may be formatted, stored, or defined as various data structures in extensible Markup Language (XML) documents, text files, Virtual Storage Access Method (VSAM) files, flat files, Btrieve files, comma-separated-value (CSV) files, internal variables, one or more libraries, or any other format capable of storing or presenting the objects and their respective web methods in a hierarchical form, such as a tree with multiple nodes. In short, each repository may comprise one table or file or a plurality of tables or files stored on one computer or across a plurality of computers in any appropriate format as described above. Indeed, some or all of the particular repository may be local or remote without departing from the scope of this disclosure and store any type of appropriate data.

Knowledgebase repository 132 can be used to manage contextual help objects 104. Particularly, contextual help objects 104 can be developed on or published to a knowledgebase server, database, or other repository, such as knowledgebase repository 132. As described above, contextual help objects 104 may be "just-in-time" help objects. For example, a just-in-time contextual help object may include a help object created and distributed at the point of use, such as when a business object is created in an application. Just-in-time contextual help can enhance ready-made application software or previously coded or modeled applications with help context. Enhancing applications with contextual help can improve the usability of the application by increasing the user efficiency with guidance and contextual help. In this description contextual help may be referred to as "just-in-time" help and it may be understood that either implication refers to linked graphically displayed help in an application at run-time. The knowledgebase repository 132 can apply automated deductive reasoning to the contextual help objects and determine whether to link a particular contextual help object to an application.

Application 126 can graphically display the contextual help 133 in a help display area 136. More specifically, a developer may create, or use previously created business objects 102 to develop application 126. For example, business objects 102 may reside in a development repository 131 and a developer may drop the objects into the application 126 to create a functional GUI. Development repository 131 may contain links to third party business objects which may be passed along to the development environment 140. Development environment 140 may include or otherwise utilize a map of objects 138. The map of objects 138 may contain GUI business objects showing a linking between business objects and contextual help objects that the system 100 stores when the developer creates applications based on existing or created objects. An example of a mapped object is shown in FIG. 3 of this description. After creation of the application 126, toolkit 128 may link business objects 102 to contextual help objects 104 that may reside locally (in the knowledgebase repository 132). In some embodiments, knowledgebase repository 132 may contain links to third party help objects (such as providers 112) and may also be selected and dropped into the application 126. For example, a drag-and-drop operation can create a help link 134 in application 126 that links back to a remote contextual help object 104. In another example, the modeling environment 116 (whether via the toolkit or not) may automatically recognize that the business objects 102 may have been previously linked to a help object 104 and may default the link 134. Indeed, modeling environment 116 may automatically update links 134 based on new or changed help objects 104, business objects 102, applications 124 or 126, or profiles or initialization parameters. As described above, this link 134 may be based on all or a portion of metadata associated with the particular piece of functionality. For example, if this metadata changes in any way, the link 134 may be automatically removed.

The help link 134 can be displayed in application 126 and may display the contents of the link (contextual help) in the help display area 136. More specifically, the help link can contain help information relating to a particular business object in an application. For example, in an application, a user may wish to add a particular business object to a business model, and may want to assign help information for how to use the object correctly. A contextual help link placed in the business object portion of the application can connect the user with information on how to use the business object. In this example, the help information can be obtained from the contextual help object 130 in the knowledgebase repository 132. Help links can then be displayed in the modeled application (such as within a help display area in the modeled application).

Returning to FIG. 1A, server 108 may also include interface 117 for communicating with other computer systems, such as clients 110, over network 106 in a client-server or other distributed environment. In certain embodiments, server 108 receives data from internal or external senders through interface 117 for storage in memory 105 and/or processing by processor 120 or processor 122. Generally, interface 117 comprises logic encoded in software and/or hardware in a suitable combination and operable to communicate with network 106. More specifically, interface 117 may comprise software supporting one or more communications protocols associated with communications network 106 or hardware operable to communicate physical signals. Interface 117 may allow communications across network 106 via a virtual private network (VPN), SSH (Secure Shell) tunnel, or other secure network connection.

Network 106 facilitates wireless or wireline communication between computer server 108 and any other local or remote computer, such as clients 110. Network 106 may be all or a portion of an enterprise or secured network. In another example, network 106 may be a VPN merely between server 108 and client 110 across wireline or wireless link. Such an example wireless link may be via 802.11a, 802.11b, 802.11g, 802.20, WiMax, and many others. While illustrated as a single or continuous network, network 106 may be logically divided into various sub-nets or virtual networks without departing from the scope of this disclosure, so long as at least a portion of network 106 may facilitate communications between server 108 and at least one client 110. In other words, network 106 encompasses any internal or external network, networks, sub-network, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 106 may be a secure network associated with the enterprise and certain local or remote clients 110.

Client 110 is any computing device operable to connect or communicate with server 108 or network 106 using any communication link. At a high level, each client 110 includes or executes at least GUI 142 and comprises an electronic computing device operable to receive, transmit, process and store any appropriate data associated with system 100. It will be understood that there may be any number of clients 110 communicably coupled to server 108. Further, "client 110," "developer," and "user" may be used interchangeably as appropriate without departing from the scope of this disclosure. Moreover, for ease of illustration, each client 110 is described in terms of being used by one user. But this disclosure contemplates that many users may use one computer or that one user may use multiple computers. As used in this disclosure, client 110 is intended to encompass a personal computer, touch screen terminal, workstation, network computer, kiosk, wireless data port, smart phone, personal data assistant (PDA), one or more processors within these or other devices, or any other suitable processing device. For example, client 110 may be a PDA operable to wirelessly connect with external or unsecured network. In another example, client 110 may comprise a laptop that includes an input device, such as a keypad, touch screen, mouse, or other device that can accept information, and an output device that conveys information associated with the operation of server 108 or clients 110, including digital data, visual information, or GUI 142. Both the input device and output device may include fixed or removable storage media such as a magnetic computer disk, CD-ROM, or other suitable media to both receive input from and provide output to users of clients 110 through the display, namely the client portion of GUI or application interface 142.

GUI 142 comprises a graphical user interface operable to allow the user of client 110 to interface with at least a portion of system 100 for any suitable purpose, such as viewing application or help component data. Generally, GUI 142 provides the particular user with an efficient and user-friendly presentation of data provided by or communicated within system 100. As shown in later figures, GUI 142 may comprise a plurality of customizable frames or views having interactive fields, pull-down lists, and buttons operated by the user. For example, GUI 142 is operable to display certain presentation elements, such as contextual help links 134, in a user-friendly form based on what the user, or developer, is trying to accomplish. For example, GUI 142 may present an editor operable to create, manage and/or control a contextual help link 134. In another example, GUI 142 may be a web-based business process application that displays contextual help in a help display area 136, such as illustrated in FIG. 4B. GUI 142 may also present a plurality of portals or dashboards. For example, GUI 142 may display a portal that allows developers or information managers to view, create, and manage contextual help objects. GUI 142 is often configurable, supporting a combination of tables and graphs (bar, line, pie, status dials, etc.) and is able to build real-time dashboards. It should be understood that the term "graphical user interface" may be used in the singular or in the plural to describe one or more graphical user interfaces and each of the displays of a particular graphical user interface. Indeed, reference to GUI 142 may indicate a reference to the front-end or a component of any application or software, as well as the particular interface accessible via client 110, as appropriate without departing from the scope of this disclosure. Therefore, GUI 142 contemplates any graphical user interface, such as a generic web browser or touchscreen, that processes information in system 100 and efficiently presents the results to the user. Server 108 can accept data from client 110 via the web browser (e.g., Microsoft Internet Explorer or Netscape Navigator) and return the appropriate HTML or XML responses to the browser using network 106.

Figure 2A:
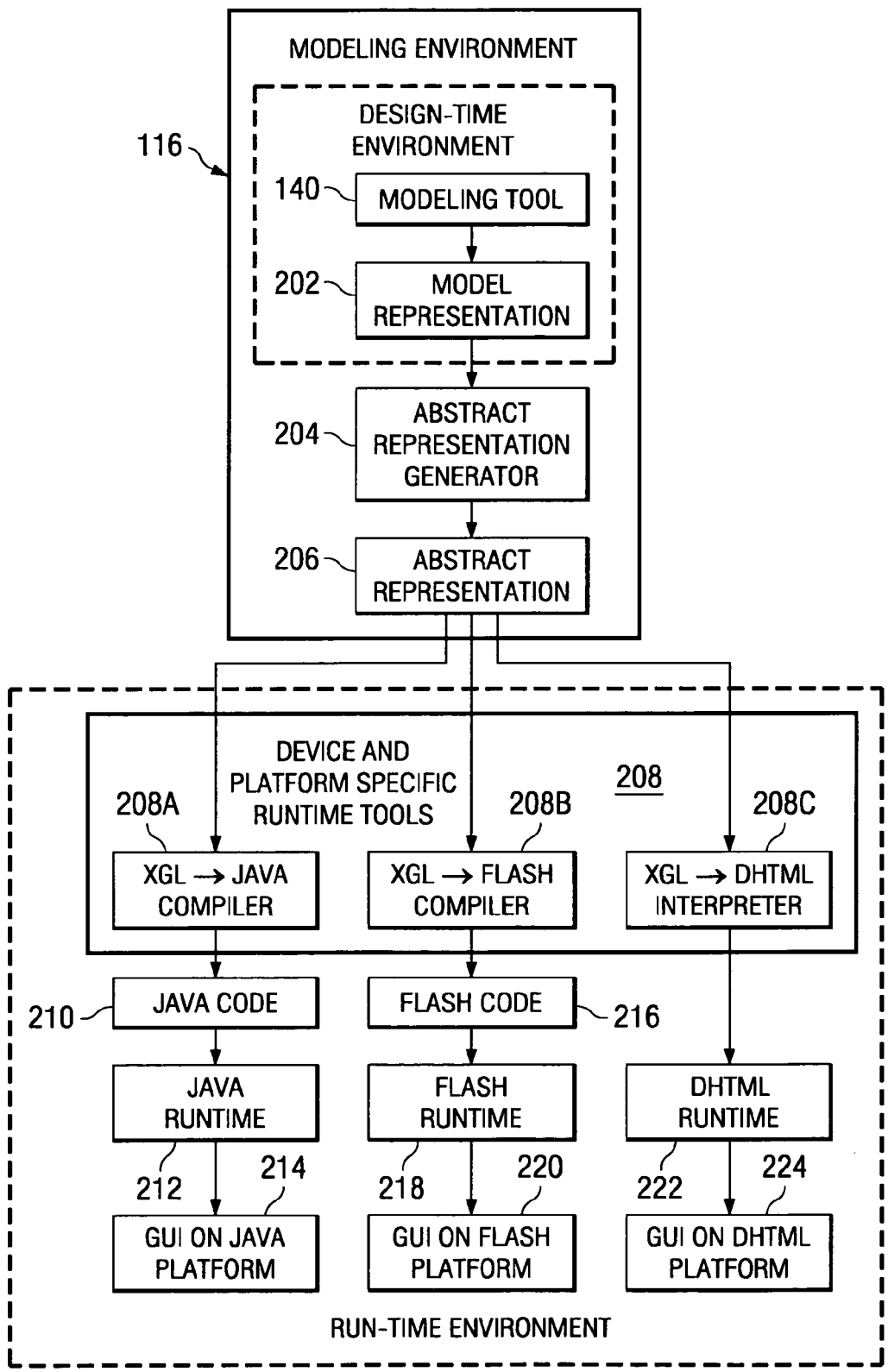
FIG. 2A depicts an example modeling environment in accordance with one embodiment of the present disclosure.

FIG. 2A depicts a more detailed example modeling environment 116 in accordance with one embodiment of the present disclosure. Such a modeling environment 116 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

In certain embodiments, the modeling environment 116 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, or device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 2A, modeling tool 140 may be used by a GUI designer or business analyst during the application design phase to create a model representation 202 for a GUI application. It will be understood that modeling environment 116 may include or be compatible with various different modeling tools 140 used to generate model representation 202. This model representation 202 may be a machine-readable representation of an application or a domain specific model. Model representation 202 generally encapsulates various design parameters related to the GUI such as GUI components, dependencies between the GUI components, inputs and outputs, and the like. Put another way, model representation 202 provides a form in which the one or more models can be persisted and transported, and possibly handled by various tools such as code generators, runtime interpreters, analysis and validation tools, merge tools, and the like. In one embodiment, model representation 202 maybe a collection of XML documents with a well-formed syntax.

Illustrated modeling environment 116 also includes an abstract representation generator (or XGL generator) 204 operable to generate an abstract representation (for example, XGL representation or XGL-compliant representation) 206 based upon model representation 202. Abstract representation generator 204 takes model representation 202 as input and outputs abstract representation 206 for the model representation. Model representation 202 may include multiple instances of various forms or types depending on the tool/language used for the modeling. In certain cases, these various different model representations may each be mapped to one or more abstract representations 206. Different types of model representations may be transformed or mapped to XGL representations. For each type of model representation mapping rules may be provided for mapping the model representation to the XGL representation 206. Different mapping rules may be provided for mapping a model representation to an XGL representation.

This XGL representation 206 that is created from a model representation may then be used for processing in the runtime environment. For example, the XGL representation 206 may be used to generate a machine-executable runtime GUI (or some other runtime representation) that may be executed by a target device. As part of the runtime processing, the XGL representation 206 may be transformed into one or more runtime representations, which may indicate source code in a particular programming language, machine-executable code for a specific runtime environment, executable GUI, and so forth, that may be generated for specific runtime environments and devices. Since the XGL representation 206, rather than the design-time model representation is used by the runtime environment, the design-time model representation is decoupled from the runtime environment. The XGL representation 206 can thus serve as the common-ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 206 generated for a model representation 202 is generally declarative and executable in that it provides a representation of the GUI of model 202 that is not dependent on any device or runtime platform, is not dependent on any programming language, and unambiguously encapsulates execution semantics for the GUI. The execution semantics may include for example, identification of various components of the GUI, interpretation of connections between the various GUI components, information identifying the order of sequencing of events, rules governing dynamic behavior of the GUI, rules governing handling of values by the GUI, and the like. The abstract representation 206 is also not GUI runtime-platform specific. The abstract representation 206 provides a self-contained, closed, and deterministic definition of all aspects of a graphical user interface that is device independent and language independent.

Abstract representation 206 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract generator 204 may be configured to generate abstract representation 206 for models of different types, which may be created using different modeling tools 140. It will be understood that modeling environment 116 may include some, none, or other sub-modules or components as those shown in this example illustration. In other words, modeling environment 116 encompasses the design-time environment (with or without the abstract generator or the various representations), a modeling toolkit (such as 140) linked with a developer's space, or any other appropriate software operable to decouple models created during design-time from the runtime environment. Abstract representation 206 provides an interface between the design time environment and the runtime environment. As shown, this abstract representation 206 may then be used by runtime processing.

As part of runtime processing, modeling environment may various runtime tools 208 may generate different types of runtime representations based upon the abstract representation 206. Examples of runtime representations include device or language-dependent (or specific) source code, runtime platform-specific machine-readable code, GUIs for a particular target device, and the like. The runtime tools 208 may include compilers, interpreters, source code generators, and other such tools that are configured to generate runtime platform-specific or target device-specific runtime representations of abstract representation 206. The runtime tool 208 may generate the runtime representation from abstract representation 206 using specific rules that map abstract representation 206 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 206 to any number of target runtime representation directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 2A, an XGL-to-Java compiler 208a may take abstract representation 206 as input and generate Java code 210 for execution by a target device comprising a Java runtime 212. Java runtime 212 may execute Java code 210 to generate or display a GUI 214 on a Java-platform target device. As another example, an XGL-to-Flash compiler 208b may take abstract representation 206 as input and generate Flash code 216 for execution by a target device comprising a Flash runtime 218. Flash runtime 218 may execute Flash code 216 to generate or display a GUI 220 on a target device comprising a Flash platform. As another example, an XGL-to-DHTML (dynamic HTML) interpreter 208c may take abstract representation 206 as input and generate DHTML statements (instructions) on the fly which are then interpreted by a DHTML runtime 222 to generate or display a GUI 224 on a target device comprising DHTML platform.

It should be apparent that abstract representation 206 may be used to generate GUIs for Extensible Application markup Language (XAML) or various other runtime platforms and devices. The same model representation 206 may be mapped to various runtime representations and device-specific and runtime platform-specific GUIs. In general, in the runtime environment, machine executable instructions specific to a runtime environment may be generated based upon the abstract representation 206 and executed to generate a GUI in the runtime environment. The same XGL representation may be used to generate machine executable instructions specific to different runtime environments and target devices.

According to certain embodiments, the process of mapping a model representation 202 to an abstract representation 206 and mapping an abstract representation 206 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 206 rather than model representation 202 for runtime processing, the model representation 202 that is created during design-time is decoupled from the runtime environment. Abstract representation 206 thus provides an interface between the modeling environment and the runtime environment. As a result, changes may be made to the design time environment, including changes to model representation 202 or changes that affect model representation 202, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

FIG. 2B depicts an example process for mapping a model representation 202 to a runtime representation using the example modeling environment 116 of FIG. 2A or some other modeling environment. Model representation 202 may comprise one or more model GUI components and associated properties that describe a GUI. The abstract representation 206 is generated based upon model representation 202. Abstract representation 206 may be generated by the abstract representation generator 204. Abstract representation 206 comprises one or more abstract GUI components and properties associated with the abstract GUI components. As part of generation of abstract representation 206, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI such as in response to events whether clicking/dragging, or scrolling, interactions between GUI components and such.

One or more runtime representations 250a including GUIs for specific runtime environment platform may be generated from abstract representation 206. A device-dependent runtime representation may be generated for a particular type of target device platform to be used for executing and displaying the GUI encapsulated by the abstract representation. The GUIs generated from abstract representation 206 may comprise various types of GUI elements such as buttons, windows, scrollbars, inputs boxes, etc. Rules may be provided for mapping an abstract representation to a particular runtime representation. Various mapping rules may be provided for different runtime environment platforms.

FIG. 3 illustrates an example help object 104 embedded, invoked, or otherwise at least partially displayed as part of the front-end or GUI of any suitable modeled application, such as a web service. This example GUI may logically or visually include a knowledgebase (or help) area 302 and an application area 304. The knowledgebase area 302 includes a knowledgebase server 306, contextual help objects, and other data that can be linked to business objects within an application. The application area 304 can include business objects, development objects, database components, and other GUI objects as determined by a developer of the application. As shown in FIG. 3, the application includes a SalesOrderServer database 308 connected to a SalesOrderLinkGrid control 310. The SalesOrderLinkGrid control includes a "Point Details" business object 312 that can be linked to the knowledgebase area 302 by linking contextual help objects in a knowledgebase server to business objects. For example, a developer can create a logical link from the "Point Details" business object 312 to knowledgebase server 306 using a format similar to the following code example:

```
<wsdi:types>
<s:schema elementFormDefault="qualified"
```

This example structure represents the creation of a default form to display a link on a business object in the application area 304. A general database is targeted for retrieval of one or more contextual help objects. In this example, the database targeted is named HostedSolution and is located on the xyz website:

```
<targetNamespace = "http//www.xyz.com/HostedSolution">
<s:import namespace =
    http://www. xyz.com/HostedSolution2/>
```

Next, a contextual help link is added into the business object 312, and the application awaits selection of the link by a user. In some embodiments, selection of the link may not be required, as the help link may have several modes of operation.

```
<s:element name = "AdditemsChild">
<s:complexType>
<s:sequence>
<s:element minOccurs ='0'
    maxOccurs ='1'
    name = SessionItemID
    type = "s:string" />
<s:sequence>
<s:element name = "AddItemsChildResponse">
```

Upon receiving a user input response (above), such as selection of the help link, contextual help can be displayed in the application area 304 as a window, a pane, a note, a pop-up, or a balloon, or other graphical display or element of the display.

The example code below enables the SalesOrderItem contextual help information to automatically configure the application area 304 to display contextual help when the user selects the help link located on the "Point Details" business object 312. In some embodiments, automatic configuration of a GUI using the business object and the contextual help object can be based on user events, system events, application behavior, or run-time parameters. For example, contextual help can be configured for input fields in an application. Each input field may contain similar contextual help that can be displayed when a user selects the input field.

```
<s:complexType>
<s:sequence>
<s:element minOccurs='0' maxOccurs='1'
    name=AddItemschildResult
    type = "tns:SalesOrderItem" />
<s:sequence>
```

When an event occurs to trigger the automatic configuration of contextual help in an application, the development environment can locate several business objects that may link to particular contextual help objects in knowledgebase repository 132. The object location may occur upon initiation of the model-driven development environment, or alternatively, by developer request. Upon locating one or more relevant links between objects, the modeling environment can automatically present the one or more links to a user. Of course, the foregoing code excerpts are for illustration purposes only and may not represent the particular implementation.

Figure 4A:
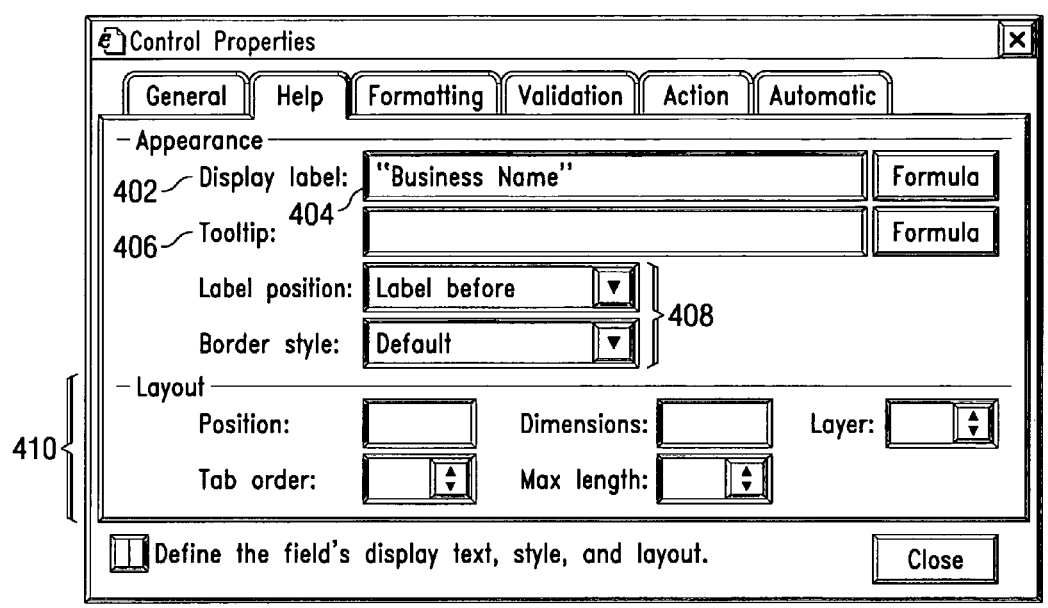
FIG. 4A illustrates an example configuration screen for formatting the appearance and layout of a contextual help link.

FIG. 4A illustrates an example configuration screen 400 for formatting the appearance and layout of a contextual help link. In particular, the configuration screen 400 is a control screen that dictates how a link will display in an application GUI 142. An information developer may use the configuration screen 400 to label the link that will display in the application 126. Here, the developer has named the link "Business Name" 404 which may indicate that this is a sales order business object requiring the name of a business for each transaction. In some embodiments, a tool tip 406 may also be added that shows the user how to use a selected item. Label positioning and border styles 408 can be determined in the configuration screen 400. A general layout section 410 is also shown. A developer can choose exact position, dimension, tab order, length and layer of the application that the link or tooltip is displayed. Other display options are possible in configuration screen 400.

FIG. 4B illustrates an example web-based business process application front-end 142 that displays contextual help in a help area 136. For example, illustrated GUI 142 may be a web service invoked through a hosted web enterprise solution. As described earlier, the contextual help can be displayed in a GUI 142 as a window, a pane, a note, a pop-up, or a balloon or other graphic display. In this example, the contextual help is shown as a help area on the right hand side of the GUI 142. The GUI 142 can contain business objects that developers may embed with contextual help objects to improve the usability and function of the application. Business objects may be developed in a first development environment while their respective contextual help objects are created in a second model-driven development environment. For example, business objects can be created in GUI 142, and may be usable and functional prior to the addition of help context. The developer may then create contextual help objects on a separate server and development environment for use in application 126. The modeling environment 116 may link the contextual help objects to business objects in GUI 142, and further, may display the help context to the user in help area 136. Alternatively, and in some embodiments, the business objects and their respective contextual help objects may be developed in the same modeling environment.

Contextual help objects 104 may be linked to several applications that contain relevant business objects. Once the contextual help object 104 is linked to a particular business object, the just-in-time help created by the linking process can be displayed in these applications. For example, two applications in a system may use the illustrated sales order business objects as part of the functionality. The developer may then graphically model or otherwise link the contextual help to the first application. If it wasn't before, the contextual help object 104 may become resident on an enterprise-wide knowledge-base available to any server or developer with appropriate access or security. A second developer could then graphically model or otherwise link the contextual help to a second application. The first and second application can embed the created contextual help into relevant business objects included in each application. In this example, the modeling environment can determine which contextual help objects should be linked to the business object, regardless of the application it is used or referenced in.

Figure 5:
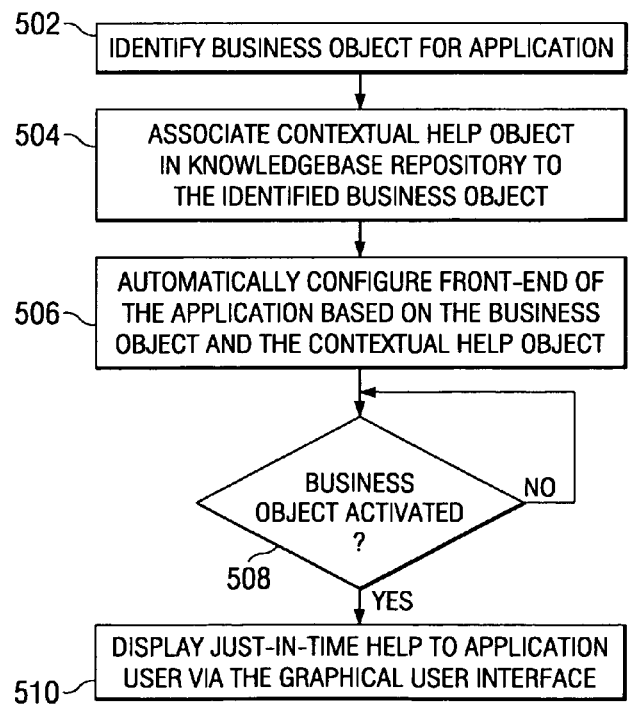
FIG. 5 is a flowchart illustrating an example method for utilizing contextual help in the system of FIG. 1 in accordance with one embodiment of the present disclosure.

FIG. 5 is a flowchart illustrating an example method 500 for utilizing contextual help in the system of FIG. 1A. Generally, method 500 describes modeling environment 116 using one or more knowledgebase servers to develop new contextual help objects and graphically model at least some portion of the help object for application 126. For example, illustrated method 500 begins at step 502, where one or more business objects is identified for a particular application. A business object can be identified by a developer for purposes of applying contextual help information to the object. For example, application 126 may include a part number business object where a user enters a product part number in a particular format. In this example, it may be useful to add a contextual help object to graphically show the user the exact formatting to use when entering a product part number. Identifying business objects to add contextual help may occur within any model-driven development environment, such as modeling environment 116. In particular, modeling environment 116 can invoke a toolkit 128 to associate the previously developed contextual help object (located in knowledgebase repository 132) with an identified business object located in application 126, in step 504.

Once a business object has been identified and associated with a contextual help object within knowledgebase repository 132, application 126 may automatically configure the application GUI to display contextual help on the business object, in step 506. Next, method 500 shows an inquiry as to whether or not a preconfigured business object has been activated, in step 506. For example, a business object can be activated by a user of the application with a keystroke, mouse over, mouse selection, or automatically activated upon launching of the application. If the preconfigured business object has not been activated, the method 500 waits until one of several business objects containing contextual help has been activated. If the preconfigured business object has indeed been activated, contextual help is displayed to the user of application 142, in step 510. In some embodiments, an options screen (not shown) may appear to the user, such that the application user may select how to view the help content. For example, the user may prefer to view help content in balloons within the application, rather than a link or a sidebar. In some embodiments, a help link may be displayed to the user instead of actual help content.

The preceding flowchart and accompanying description illustrate exemplary method 500. But system 100 (or its software or other components) contemplates using, implementing, or executing any suitable technique for performing these and other tasks. It will be understood that this method is for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for utilizing contextual help in a modeling environment comprising:

identifying a business objects for a modeled application;

associating a contextual help object in a knowledgebase repository to the identified business object, wherein the contextual help object provides guidance and help context associated with usability of the identified business object;

automatically configuring a front-end of the application using a modeling environment and based on a first instance of the business object and the contextual help object in a first GUI;

upon activation of the first instance of the business object, displaying at least a portion of the business object in a first portion of a first graphical user interface (GUI), and displaying just-in-time help information associated with the contextual help object in a different second portion of the first GUI to a user of the application via the front-end; the method further comprising:

automatically configuring the front-end of the application using the modeling environment and based on a second instance of the business object and the contextual help object in a second GUI; and upon activation of the second instance of the business object, displaying at least a portion of the second instance of the business object in a first portion of the second GUI, and displaying the just-in-time help information associated with the contextual help object in the second portion of the second GUI to a user of the second application via the front-end.

2. The method of claim 1 further comprising:

identifying a second business object for a second application;

associating the contextual help object to the identified second business object;

automatically configuring the front-end of the second application using the modeling environment and based on the second business object and the contextual help object; and upon activation of the second business object, displaying at least a portion of the business object in the first portion of the GUI, and displaying just-in-time help information associated with the contextual help object in the second portion of the GUI to the user of the second application via the front-end.

3. The method of claim 1, the business object developed by a first development entity and the contextual help object developed by a second development entity different than the first development entity the contextual help object developed separately from the business object.

4. The method of claim 1, the contextual help object associated with one of the following: a field; a screen; an error message; a business process; a best practices level; and a second business object.

5. The method of claim 1, wherein automatically configuring the front-end of the application based on the business object and the contextual help object is based on one or more events, behavior, or run-time parameters.

6. The method of claim 1, wherein the business object is identified within the modeling environment and the contextual help object is associated to the identified business object using a toolkit interfacing with the modeling environment.

7. The method of claim 6, wherein the modeling environment is located on a server separate from the knowledgebase repository.

8. The method of claim 6, upon initiation of the modeling environment, further comprising:
   locating a plurality of business objects and a plurality of contextual help objects referenced by the knowledgebase repository; and
   automatically presenting at least a subset of the located business objects and at least a subset of the located contextual help objects to a developer.

9. A computer program product encoded on a non-transitory computer readable storage medium, the product comprising computer-readable instructions for causing one or more processors to perform operations comprising:
   identifying a business objects for a modeled application;
   associating a contextual help object in a knowledgebase repository to the identified business object, wherein the contextual help object provides guidance and help context associated with usability of the identified business object;
   automatically configuring a front-end of the application using a modeling environment and based on a first instance of the business object and the contextual help object in a first GUI;
   upon activation of the first instance of the business object, displaying at least a portion of the business object in a first portion of a first graphical user interface (GUI), and displaying just-in-time help information associated with the contextual help object in a different second portion of the first GUI to a user of the application via the front-end; the method further comprising:
   automatically configuring the front-end of the application using the modeling environment and based on a second instance of the business object and the contextual help object in a second GUI; and
   upon activation of the second instance of the business object, displaying at least a portion of the second instance of the business object in a first portion of the second GUI, and displaying the just-in-time help information associated with the contextual help object in the second portion of the second GUI to a user of the second application via the front-end.

10. The computer program product of claim 9, the product comprising instructions for causing one or more processors to perform operations further comprising:
    identifying a second business object for a second application;
    associating the contextual help object to the identified second business object;
    automatically configuring the front-end of the second application using the modeling environment and based on the second business object and the contextual help object; and
    upon activation of the second business object, displaying at least a portion of the business object in the first portion of the GUI, and displaying just-in-time help information associated with the contextual help object in the second portion of the GUI to the user of the second application via the front-end.

11. The computer program product of claim 9, the business object developed by a first development entity and the contextual help object developed by a second development entity different than the first development entity the contextual help object developed separately from the business object.

12. The computer program product of claim 9, the contextual help object associated with one of the following:
    a field;
    a screen;
    an error message;
    a business process;
    a best practices level; and
    a second business object.

13. The computer program product of claim 9, wherein automatically configuring the front-end of the application using the business object and the contextual help object is based on one or more events, behavior, or run-time parameters.

14. The computer program product of claim 9, wherein the business object is identified within the modeling environment and the contextual help object is associated to the identified business object using a toolkit interfacing with the modeling environment.

15. The computer program product of claim 14, wherein the modeling environment is located on a server separate from the knowledgebase repository.

16. The computer program product of claim 14, upon initiation of the modeling environment, the product comprising instructions for causing one or more processors to perform operations further comprising:
    locating a plurality of business objects and a plurality of contextual help objects referenced by the knowledgebase repository; and
    automatically presenting at least a subset of the located business objects and at least a subset of the located contextual help objects to a developer.

* * * * *